(12) United States Patent
Bagnasco et al.

(10) Patent No.: US 8,682,569 B2
(45) Date of Patent: Mar. 25, 2014

(54) SYSTEMS AND METHODS FOR DIAGNOSING VALVE LIFT MECHANISMS AND OIL CONTROL VALVES OF CAMSHAFT LIFT SYSTEMS

(75) Inventors: Andrew P. Bagnasco, Plymouth, MI (US); Joshua D. Cowgill, Hartland, MI (US); Joseph R. Dulzo, Novi (MA); Raymond Claude Turin, Grosse Pointe Park, MI (US); Matthew A. Wiles, Royal Oaks, MI (US)

(73) Assignee: GM Global Technology Operations LLC

( * ) Notice: Subject to any disclaimer, the term of this patent is extended or adjusted under 35 U.S.C. 154(b) by 877 days.

(21) Appl. No.: 12/640,786

(22) Filed: Dec. 17, 2009

(65) Prior Publication Data
US 2011/0153181 A1    Jun. 23, 2011

(51) Int. Cl.
| | |
|---|---|
| *F01L 9/04* | (2006.01) |
| *F01L 1/34* | (2006.01) |
| *F02B 47/08* | (2006.01) |
| *F02M 25/07* | (2006.01) |
| *F02D 41/00* | (2006.01) |
| *G01M 15/00* | (2006.01) |
| *G06F 11/30* | (2006.01) |

(52) U.S. Cl.
USPC .................. 701/109; 123/90.15; 123/90.16; 123/90.17; 123/90.18; 123/568.16; 701/102; 701/103; 701/104; 73/114.74; 73/114.79

(58) Field of Classification Search
USPC .......... 123/90.11, 90.15, 90.16, 90.18, 196 S, 123/478, 480, 568.16, 679, 690; 701/102, 701/103, 104, 110, 114; 73/114.74, 114.79
See application file for complete search history.

(56) References Cited

U.S. PATENT DOCUMENTS

| | | | |
|---|---|---|---|
| 6,314,952 B1 | 11/2001 | Turin et al. | |
| 7,740,003 B2 | 6/2010 | Rayl | |
| 7,921,701 B2 * | 4/2011 | Cinpinski et al. | 73/114.41 |
| 7,921,710 B2 * | 4/2011 | Cinpinski et al. | 73/114.79 |
| 2004/0168659 A1 * | 9/2004 | Shindou et al. | 123/90.16 |
| 2009/0132146 A1 * | 5/2009 | Dibble et al. | 701/102 |
| 2009/0228167 A1 * | 9/2009 | Waters et al. | 701/29 |
| 2010/0070159 A1 * | 3/2010 | Iwahashi et al. | 701/105 |
| 2010/0082297 A1 | 4/2010 | Turin et al. | |
| 2010/0250089 A1 * | 9/2010 | Buslepp et al. | 701/102 |
| 2010/0281966 A1 * | 11/2010 | Cinpinski et al. | 73/114.25 |
| 2011/0106405 A1 * | 5/2011 | Dulzo et al. | 701/103 |
| 2012/0130623 A1 * | 5/2012 | Ide et al. | 701/105 |
| 2012/0209494 A1 * | 8/2012 | Verdejo et al. | 701/102 |

* cited by examiner

*Primary Examiner* — Stephen K Cronin
*Assistant Examiner* — Raza Najmuddin

(57) ABSTRACT

A system for diagnosing a switchable roller finger follower (SRFF) and an oil control valve (OCV) includes a signal monitoring module and a fault detection module. The signal monitoring module receives at least one of an individual cylinder fuel correction (ICFC) signal and an air/fuel ratio imbalance (AFIM) signal when: an engine speed signal is within a predetermined range of speed; an engine load signal is within a predetermined range of load; and a charcoal canister vapor signal is within a predetermined range of flow rate. The fault detection module detects a fault of at least one of a SRFF and an OCV based on an exhaust gas recirculation value and at least one of the ICFC and AFIM signals. The ICFC and AFIM signals are generated based on: an engine position signal; and at least one of an oxygen signal and a wide range air fuel signal.

22 Claims, 8 Drawing Sheets

SYSTEMS AND METHODS FOR DIAGNOSING VALVE LIFT MECHANISMS AND OIL CONTROL VALVES OF CAMSHAFT LIFT SYSTEMS

FIELD

The present disclosure relates to vehicle control systems, and more particularly to diagnostic systems for individual cylinder valve lift mechanisms and oil control valves that actuate the individual cylinder valve lift mechanisms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an internal combustion engine (ICE) that generates drive torque. The ICE combusts an air/fuel mixture within cylinders to drive pistons that produce the drive torque. The air/fuel mixture is regulated via intake and exhaust valves. The intake valves are selectively opened to draw air into the cylinders. The air is mixed with fuel to form the air/fuel mixture. The exhaust valves are selectively opened to allow exhaust gas to exit from the cylinders after combustion of the air/fuel mixture.

The engine may include one or more camshafts that regulate opening and closing times of the intake and exhaust valves. The camshafts include cam lobes that each has a profile that is associated with a valve lift schedule. The valve lift schedule includes an amount of time a valve is open (i.e. duration) and a magnitude or degree to which the valve opens (i.e. lift).

Variable valve actuation (VVA) technology improves fuel economy, engine efficiency, and/or performance by modifying a valve lift event, timing, and duration as a function of engine operating conditions. Two-step VVA systems include variable valve assemblies such as hydraulically controlled switchable roller finger followers (SRFFs). SRFFs enable two discrete valve states (e.g. a low-lift state and a high-lift state) for the intake and/or exhaust valves. Example SRFFs are provided and described in U.S. application Ser. No. 12/062,920, filed on Apr. 4, 2008, and U.S. application Ser. No. 11/943,884, filed on Nov. 21, 2007.

An engine control module (ECM) may transition a SRFF mechanism from a low-lift state to a high-lift state and vice versa based on demanded engine speed and load. For example, an ICE operating at an elevated engine speed, such as 3,000 revolutions per minute (RPM), typically requires the SRFF mechanism to operate in a high-lift state to avoid potential hardware damage to the ICE.

The SRFF mechanism may be actuated by an oil control valve (OCV) that controls one or more SRFFs. The OCV may be used to control a flow of engine oil to control the SRFFs associated with the OCV. Improper operation of the OCV may cause improper operation of and/or damage to an SRFF. An improperly operating SRFF may cause an intake and/or exhaust valve to be stuck in one of the low-lift or high-lift states.

SUMMARY

In one embodiment, a system is provided that includes a signal monitoring module and a fault detection module. The signal monitoring module receives a cylinder fuel correction signal when: an engine speed signal is within a first predetermined range of a speed for a predetermined period; an engine load signal is within a second predetermined range of a load for the predetermined period; and a charcoal canister vapor signal is within a third predetermined range of a flow rate for the predetermined period. The fault detection module detects a fault of at least one of a switchable roller finger follower (SRFF) and an oil control valve (OCV) based on the cylinder fuel correction signal and an exhaust gas recirculation (EGR) value. The cylinder fuel correction signal is generated based on: an engine position signal; and at least one of an oxygen signal and a wide range air fuel (WRAF) signal.

In other features, a system is provided that includes a signal monitoring module and a fault detection module. The signal monitoring module receives an air/fuel ratio imbalance signal when: an engine speed signal is within a first predetermined range of a speed for a predetermined period; an engine load signal is within a second predetermined range of a load for the predetermined period; and a charcoal canister vapor signal is within a third predetermined range of a flow rate for the predetermined period. The fault detection module detects a fault of at least one of a SRFF and an OCV based on the air/fuel ratio imbalance signal and at least one of a residual exhaust gas level of a cylinder of the engine and an intake-to-exhaust camshaft overlap. The air/fuel ratio imbalance signal is generated based on: an engine position signal; and at least one of an oxygen signal and a WRAF signal.

In other features, a method of diagnosing a camshaft lift system is provided. The method includes receiving at least one of a cylinder fuel correction signal and an air/fuel ratio imbalance signal when: an engine speed signal is within a first predetermined range of a speed for a predetermined period; an engine load signal is within a second predetermined range of a load for the predetermined period; and a charcoal canister vapor signal is within a third predetermined range of a flow rate for the predetermined period. A fault of at least one of a SRFF and an OCV is detected based on an EGR value and at least one of the cylinder fuel correction signal and the air/fuel ratio imbalance signal. The cylinder fuel correction signal and the air/fuel ratio imbalance signal are generated based on: an engine position signal; and at least one of an oxygen signal and a WRAF signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
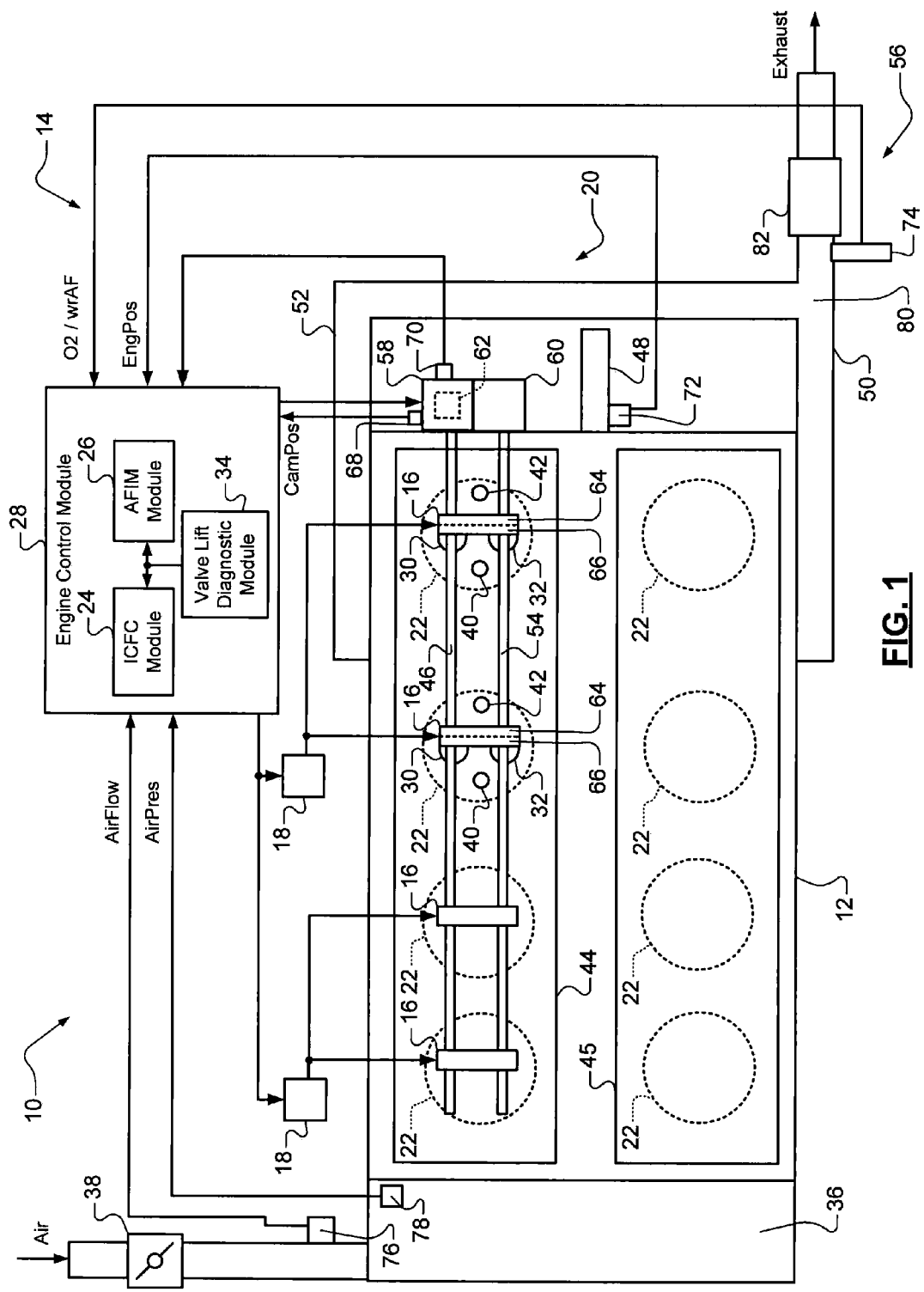
FIG. 1 is a functional block diagram of an exemplary engine control system incorporating an individual cylinder fuel control (ICFC) module and an air/fuel ratio imbalance (AFIM) module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An ICE may operate in a dual overhead camshaft configuration. The dual overhead camshaft configuration may include an exhaust camshaft and an intake camshaft for each bank of cylinders. The exhaust camshaft and the intake camshaft respectively actuate exhaust valves and intake valves of the engine. The intake valves open and close at specific times to deliver air/fuel mixtures into respective cylinders. The exhaust valves also open and close at specific times to release exhaust gas from respective cylinders. Timing of valve events affects airflow, trapped residuals, and spark advance sensitivity. A control system may adjust the timing of each cylinder via a variable valve actuation (VVA) system.

The VVA system may include a multiple-step valve lift mechanism. For example, a two-step valve lift mechanism may include variable valve lift mechanisms that are used to switch between lift states of intake valves. The lift states have corresponding lift profiles (e.g., high and low). During a high-lift state, an intake valve is lifted to a high level to allow higher levels of airflow than during a low-lift state in order to provide determined torque and power outputs. During a low-lift state, the intake valve is lifted to a low level in order to improve efficiency by reducing engine pumping work. The low-lift state may include a zero-lift state if the VVA system is designed to deactivate the cylinders for fuel economy. The zero-lift state refers to when the intake and exhaust valves remain closed during a cylinder deactivation for an improvement in fuel economy and a reduction in exhaust emissions.

An intake valve that is stuck in a low-lift state (SIL) or in a high-lift state (SIH) can cause an air/fuel ratio imbalance in an ICE. The air/fuel ratio imbalance may refer to a condition in which an air/fuel ratio indicates a richer or leaner air/fuel mixture than a stoichiometric air/fuel mixture (e.g., 14.7:1). The air/fuel ratio imbalance during the low-lift state may be compared to the air/fuel ratio imbalance during the high-lift state to detect a fault in the valve lift mechanism. The air/fuel ratio imbalance may be detected by an engine control module (ECM) based on information from an oxygen sensor. One or more oxygen sensors may be used to detect oxygen level(s) in an exhaust gas and generate respective oxygen signals.

The oxygen sensor may be a wide range air fuel (WRAF) sensor that detects oxygen level(s) in an exhaust gas and generates respective WRAF signals. The WRAF sensor is essentially an oxygen sensor that detects an air/fuel ratio of the exhaust gas based on changes in oxygen level(s) in the exhaust gas. The ECM may use the outputs of the oxygen and/or WRAF sensors to correct the air/fuel ratio imbalance.

A variation in the air/fuel ratio imbalance between the low-lift and high-lift states may be caused by changes in an amount of residual exhaust gas in a cylinder. The amount of residual exhaust gas varies when one or more intake valves are stuck in a low-lift or high-lift state. An exhaust gas recirculation (EGR) system may be used to re-circulate and regulate the amount of residual exhaust gas that is returned to cylinders of an engine. This amount of residual exhaust gas is referred to as an EGR amount (EGR value). The EGR system may actuate intake and exhaust camshafts of a camshaft lift system to control an overlap between intake and exhaust strokes.

The amount of residual exhaust gas that remains in the cylinders may depend on an amount of intake-to-exhaust camshaft overlap, an intake manifold pressure, an exhaust manifold pressure, and valve lift profiles. For example, the amount of intake-to-exhaust camshaft overlap may correspond to an amount of residual exhaust gas that the cylinders receive for combustion purposes (residual exhaust gas level(s)). The amount of residual exhaust gas increases as the intake-to-exhaust camshaft overlap increases. Conversely, the cylinders receive less residual exhaust gas as the intake-to-exhaust camshaft overlap decreases. Changes in the amount of residual exhaust gas received by the cylinders may cause the residual exhaust gas imbalance and affect the air/fuel ratio imbalance.

An air/fuel mixture may be adjusted by an ECM to produce a stoichiometric air/fuel mixture (e.g., 14.7:1). Adjustments in the air/fuel mixture alter chemical makeup of the exhaust gas, such as the amounts of nitrogen oxides (NOx) and carbon oxides (COx) produced. For example, combustion of a lean air/fuel mixture (e.g., greater than 14.7:1) produces a greater concentration of NOx than in an exhaust gas produced by combustion of a stoichiometric air/fuel mixture. A rich air/fuel mixture (e.g., less than 14.7:1) may produce exhaust gas with a greater concentration of COx than an exhaust gas produced by combustion of a stoichiometric air/fuel mixture.

A faulty two-step VVA system tends to exhibit inconsistent and non-uniform lift transitions. This can cause hardware damage to engine components and/or drivability of an engine due to faults with one or more of the SRFFs and/or the corresponding OCVs. Engines equipped with the VVA system require accurate fault detection of a variable valve lift mechanism to maintain consistent and desired engine performance. The embodiments of the present disclosure provide techniques for diagnosing a variable valve lift mechanism and a corresponding OCV during engine operation. The diagnostic techniques improve engine efficiency and reduce risks of degradation to engine components.

In FIG. 1, an exemplary engine control system 10 of a vehicle is shown. The engine control system 10 may include an engine 12 and a diagnostic system 14. The diagnostic system 14 detects faults with SRFF mechanisms 16 and/or corresponding OCVs 18 of a camshaft lift system 20 based on at least one of an individual cylinder fuel correction signal and an air/fuel ratio imbalance signal.

The individual cylinder fuel correction signal indicates corrected fuel amounts provided to cylinders 22 of the engine 12 to correct current fuel amounts received by the cylinders 22. The corrected fuel amounts may be determined by an individual cylinder fuel control (ICFC) module 24 based on an oxygen signal and/or a WRAF signal and an engine position signal. Examples of how to calculate a corrected fuel amount are provided in U.S. Pat. No. 6,314,952, issued on Nov. 13, 2001.

The air/fuel ratio imbalance signal indicates a level of imbalance in air/fuel ratio that is administered to the cylinders 22. The level of imbalance may be determined by an air/fuel ratio imbalance (AFIM) module 26 based on the oxygen signal and/or the WRAF signal and the engine position signal. The AFIM module 26 generates an observer table that stores a level of air/fuel ratio imbalance in each of the cylinders 22 relative to other cylinders monitored (i.e., observed) by the oxygen and/or WRAF sensors.

For example, during an intrusive diagnostic test, the observer table is generated and stored in memory during each lift state. A first observer table during the low-lift state and a second observer table during the high-lift state are compared to diagnose the camshaft lift system 20 based on the level of air/fuel ratio imbalance. Examples of how to calculate a level of imbalance are provided in U.S. application Ser. No. 12/326,463, filed on Dec. 2, 2008.

The diagnostic system 14 may include an ECM 28 with the camshaft lift system 20. The camshaft lift system 20 controls opening and closing times of intake valves 30 and exhaust valves 32 of the cylinders 22. The camshaft lift system 20 also controls valve lift operations via the SRFF mechanisms 16. Each of the cylinders 22 may have at least one corresponding intake valve and at least one corresponding exhaust valve.

The ECM 28 may include a valve lift diagnostic module 34, the ICFC module 24, and the AFIM module 26. The valve lift diagnostic module 34 detects faults with the SRFF mechanisms 16 and/or the OCVs 18 based on at least one of the individual cylinder fuel correction signal and the air/fuel ratio imbalance signal. The ICFC module 24 and the AFIM module 26 respectively generate the individual cylinder fuel correction signal and the air/fuel ratio imbalance signal.

For example, the valve lift diagnostic module 34 identifies one or more of the cylinders 22 associated with faulty SRFF mechanisms 16 and/or OCVs 18 using one of the ICFC module 26 and the AFIM module 26. Alternatively or in addition, both the ICFC module 26 and the AFIM module 26 may be used to detect faults with the SRFF mechanisms 16 and/or the OCVs 18. The valve lift diagnostic module 34 may command remedial actions (e.g. limiting engine speed) to prevent damage to engine components. Examples of the valve lift diagnostic module 34, the ICFC module 24, and the AFIM module 26 are described with respect to the embodiments of FIG. 2.

During engine operation, air is drawn into an intake manifold 36 through a throttle 38. The throttle 38 regulates mass air flow into the intake manifold 36. The air within the intake manifold 36 is distributed into the cylinders 22. The cylinders 22 may also include fuel injectors 40 and spark plugs 42. Although eight cylinders 22 are illustrated, the engine 12 may include any number of cylinders. The engine 12 may have one or more cylinder banks 44, 45 that include any number of cylinders 22. For simplicity, four cylinders 22 are shown in each of the cylinder banks 44, 45. Each of the cylinders 22 may have corresponding intake valves, exhaust valves, fuel injectors, spark plugs, and SRFF mechanisms.

The fuel injectors 40 inject fuel that is combined with intake air to form air/fuel mixtures in the cylinders 22. Although a gasoline powered internal combustion engine is shown, the embodiments disclosed herein apply to diesel or alternative fuel sourced engines. The fuel injectors 40 are controlled to provide desired air-to-fuel (A/F) ratios within the cylinders 22. The intake valves 30 selectively open to enable intake air to enter the cylinders 22. Intake valve positioning is regulated by an intake camshaft 46.

The spark plugs 42 initiate combustion of the air/fuel mixtures and drive pistons in the cylinders 22. The pistons drive a crankshaft 48 to produce drive torque. Combustion exhaust within the cylinders 22 is released out exhaust manifolds 50, 52. Exhaust valve positioning is regulated by an exhaust camshaft 54. The exhaust is treated in an exhaust system 56. Although not shown, each of the cylinder banks 44, 45 may have corresponding intake and exhaust camshafts 46, 54 that regulate positioning of the intake and exhaust valves 30, 32.

The camshaft lift system 20 may include an intake camshaft phaser 58 and an exhaust camshaft phaser 60 that respectively regulate the rotational timing of the intake and exhaust camshafts 46, 54. The timing or phase angle of the respective intake and exhaust camshafts 46, 54 may be retarded or advanced with respect to: each other; a location of one or more of the pistons within the cylinders 22; and/or a crankshaft position.

By regulating the positions of the intake valves 30 and the exhaust valves 32, the quantities of air/fuel mixtures ingested into the cylinders 22 are regulated. The intake camshaft phaser 58 may include a phaser actuator 62 that is either electrically or hydraulically actuated. Hydraulically actuated phaser actuators, for example, include an electrically-controlled fluid control valve that controls a fluid supply flowing into or out of the phaser actuator 62. For example, the fluid supply may be engine oil and thus the fluid control valve may be an oil control valve (OCV) that actuates one or more corresponding SRFF mechanisms 16.

Additionally, low-lift cam lobes (not shown) and high-lift cam lobes (not shown) are mounted to each of the intake and exhaust camshafts 46, 54. The low-lift cam lobes and the high-lift cam lobes rotate with the intake and exhaust camshafts 46, 54, and are in operative contact with a hydraulic lift mechanism such as the SRFF mechanisms 16. Distinct SRFF mechanisms may be used on each of the intake and exhaust valves 30, 32 of each of the cylinders 22.

In the example embodiment shown, each of the cylinders 22 includes two SRFF mechanisms: a first SRFF mechanism 64 that controls the intake valves 30 and a second SRFF mechanism 66 that controls the exhaust valves 32. In another embodiment, the SRFF mechanisms 16 may include other valve lift or timing mechanisms. The other valve lift or timing mechanisms may be used during a cylinder deactivation for improved fuel economy (e.g., displacement on demand or active fuel management systems).

Each of the SRFF mechanisms 16 provides at least two levels of valve lift for one of the intake and exhaust valves 30, 32. The levels of valve lift may include, for example, a low-lift state and a high-lift state, which are based on respective low-lift and high-lift cam lobes. During the low-lift state, the SRFF mechanisms 16 may open the intake and exhaust valves 30, 32 a first predetermined amount for a first predetermined period. Similarly, during the high-lift state, the SRFF mechanisms 16 may open the intake and exhaust valves 30, 32 a second predetermined amount that is greater than the first predetermined amount for a second predetermined period.

The camshaft lift system 20 may receive signals from sensors, such as a camshaft phaser position sensor 68, a pressure sensor 70, an engine position sensor 72, an oxygen sensor 74, a mass airflow (MAF) sensor 76 and an intake manifold absolute pressure (MAP) sensor 78. The camshaft phaser position sensor 68 senses, for example, a position of the intake camshaft phaser 58 and generates a camshaft lift position signal CamPos that is indicative of a position of the intake camshaft 46. The pressure sensor 70 generates a fluid pressure signal that indicates a pressure of the fluid supply (e.g. engine oil) provided to the phaser actuator 62 of the intake camshaft phaser 58. Although not shown, the exhaust camshaft phaser 60 may have a corresponding fluid control valve, camshaft phaser position sensor, and pressure sensor.

The engine position sensor 72 is responsive to a rotational position of the crankshaft 48 and generates an engine position signal EngPos. The oxygen sensor 74 generates an oxygen signal O2 or a WRAF signal wrAF that are respectively indicative of an amount of oxygen in the exhaust gas or a normalized air/fuel ratio of the exhaust gas with respect to a stoichiometric air/fuel mixture. The oxygen sensor 74 may be located, for example, downstream of the exhaust manifolds 50, 52. Additionally, the oxygen sensor 74 may be located downstream of a confluence point 80 or input and output sides of a catalyst 82. The exhaust gas passes across the oxygen sensor 74 and through the catalyst 82. The catalyst 82 selectively reacts with the exhaust gas before the exhaust gas is expelled from the exhaust manifolds 50, 52. The catalyst 82 removes particulate matter from the exhaust gas.

The oxygen signal O2 and/or the WRAF signal wrAF are indicative of respective oxygen levels of exhaust gas produced by each of the cylinders 22 of any cylinder banks 44, 45 due to the location of the oxygen sensor 74. In other words, concentrations of oxygen measured by the oxygen sensor 74 may be attributable to exhaust gas from the cylinders 22 due to mixing of the exhaust gas upstream from the location of the oxygen sensor 74. The firing order and/or the period between the firing events of the cylinders 22 can affect the concentrations. Although a single oxygen sensor is illustrated, the engine 12 may include any number of oxygen sensors. The oxygen sensor 74 may be a wide-band type oxygen sensor or a switching-type oxygen sensor.

The MAF sensor 76 generates a MAF signal AirFlow that indicates a rate of air flow through the MAF sensor 76. The MAP sensor 78 may detect an air pressure within the intake manifold 36 and generate a MAP signal AirPres. The MAP sensor 78 may be located in the intake manifold 36.

Figure 2:
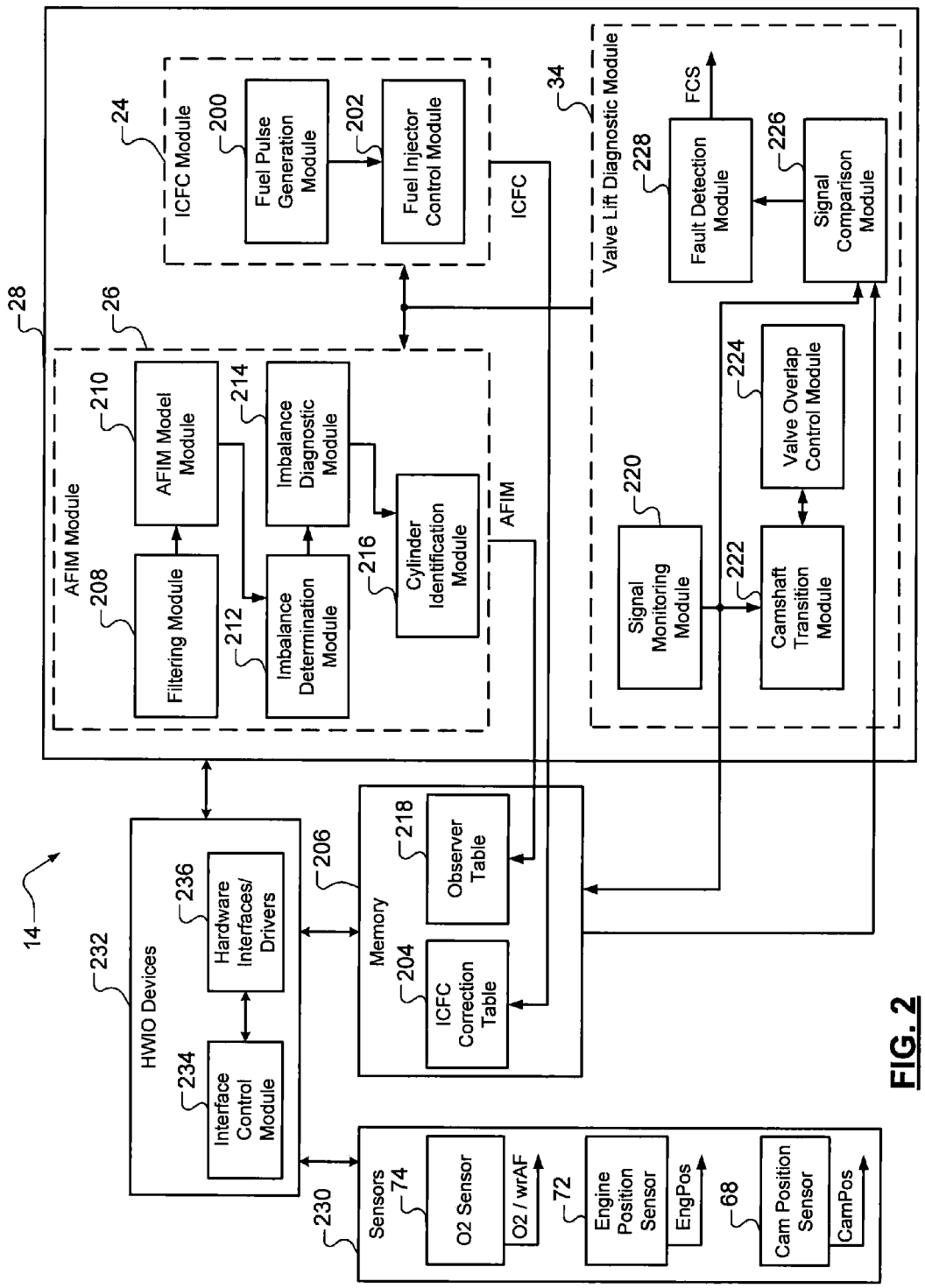
FIG. 2 is a functional block diagram of a diagnostic system for two-step valve lift mechanisms and oil control valves of camshaft lift systems in accordance with an embodiment of the present disclosure.

In FIG. 2, the diagnostic system 14 for the SRFF mechanisms 16 and the OCVs 18 of the camshaft lift system 20 is shown. The diagnostic system 14 may include the ECM 28 with the ICFC module 24, the AFIM module 26, and the valve lift diagnostic module 34.

The ICFC module 24 may include a fuel pulse generation module 200 and a fuel injector control module 202. The fuel pulse generation module 200 may generate a fuel command pulse width signal based on the engine position signal EngPos and the oxygen and/or WRAF signals O2, wrAF. The oxygen and/or WRAF signals O2, wrAF may provide an output voltage that varies in amplitude based on a deviation from an average air/fuel ratio of the cylinders 22. The fuel injector control module 202 may control the fuel injectors 40 based on the fuel command pulse width signal to provide desired air/fuel ratios for the cylinders 22. The fuel injector control module 202 provides corrections to fuel quantities for each of the cylinders 22 to obtain balanced air/fuel ratios for combustion purposes.

The ICFC module 24 may generate an individual cylinder fuel correction signal ICFC based on sampled readings of a single oxygen sensor 74. The sampled readings may be responsive to the exhaust gas of the cylinders 22 and used to detect air/fuel ratio imbalances of the cylinders 22. An integral control module may be used to eliminate the imbalances. The integral control module detects the cylinder-specific air/fuel ratio imbalances and associates a sampled oxygen sensor signal with the exhaust gas of an individual cylinder.

The association may be determined based on the sampling events that coincide with cylinder firing events based on time intervals between two subsequent firing events. Once the association is determined, individual cylinder correction factors are determined to form cylinder-specific fuel pulse widths. The individual cylinder fuel correction signal ICFC may be indicative of the individual cylinder correction factors. The individual cylinder fuel correction signal ICFC may be stored in an ICFC correction table 204 in memory 206 for diagnostic purposes.

For example only, a first set of sampled values of the individual cylinder fuel correction signal ICFC is saved in the ICFC correction table 204 for a comparison with a second set of sampled values of the same signal ICFC. The first set may be generated during a low-lift state, and the second set may be generated during a high-lift state. The ICFC correction table 204 may be stored in an electrically-erasable non-volatile memory.

The AFIM module 26 may include a filtering module 208, an AFIM model module 210, an imbalance determination module 212, and an imbalance diagnostic module 214, and a cylinder identification module 216. The filtering module 208 receives the oxygen and/or WRAF signals O2, wrAF and samples the signals O2, wrAF based on the engine position signal EngPos. More specifically, the filtering module 208 samples the signals O2, wrAF based on the firing events of the cylinders 22 with which the signals O2, wrAF are associated. The filtering module 208 may sample the signals O2, wrAF at a frequency equal to that of firing events of the cylinders 22 of the associated cylinder banks 44, 45. The signals O2, WRAF may also be sampled at a rate that is a multiple of the firing event frequency.

The AFIM model module 210 stores a predetermined number of the imbalance data samples in a first AFIM model. Accordingly, the first AFIM model includes a predetermined number of the imbalance data samples for the cylinders 22 of one of the associated cylinder banks 44, 45. The AFIM model module 210 may also include a second AFIM model for the cylinders 22 of the other one of the cylinder banks 44, 45. An output of the AFIM module 210 may be referred to as an imbalance observer.

The imbalance determination module 212 utilizes observer values of the imbalance observer for the associated cylinders 22 when the oxygen and/or WRAF signals O2, wrAF are sampled. More specifically, the imbalance determination module 212 determines air/fuel ratio imbalance metrics based on either a change in the observer values or a change in a variance of the observer values generated in an AFIM model. The observer values are indicative of respective air/fuel ratio imbalances that exist across the cylinders 22 at predetermined sampling times. The change in the observer values are based on comparisons of the observer values between before and after an intrusive action that may affect the air/fuel ratio imbalance due to a fault with an SRFF and/or an OCV. The intrusive action may refer to a change to a valve lift state or a removal of the residual exhaust gas by changing the camshaft timing to reduce valve overlap. The change in observer values may be quantified by either a subtraction or a variance of the subtraction. Using the subtraction maintains an ability to identify a faulty cylinder, but using the variance of the subtraction is easier to calibrate because the variance is a single value instead of an array.

The imbalance diagnostic module 214 selectively detects air/fuel ratio imbalances in the associated cylinder banks 44, 45 based on the observer values. More specifically, the air/ fuel ratio imbalances are detected based on a comparison between a change in observer values and a predetermined value. For example only, the imbalance diagnostic module 214 may detect an air/fuel ratio imbalance when the change in observer values is greater than the predetermined value. The predetermined value may be calibratable and may be set based on various engine system related parameters. For example, the predetermined value may be set by comparing data from faulty SRFFs against data from non-faulty SRFFs. The imbalance diagnostic module 214 may generate an AFIM detection signal based on the comparison.

The cylinder identification module 216 receives the AFIM detection signal and may identify each of the cylinders 22 of the associated cylinder banks 44, 45 based on a firing order of the spark plugs 42. The cylinder identification module 216 may then associate the cylinders 22 (i.e., the cylinder numbers) with the remainder of the imbalance data samples based on a sequence of the firing order. The cylinder identification module 216 generates the air/fuel ratio imbalance signal AFIM based on the AFIM detection signal and the firing order. The air/fuel ratio imbalance signal AFIM may be stored in an observer table 218 in the memory 206 for diagnostic purposes. The observer table 218 may be stored in an electrically-erasable non-volatile memory.

The observer table 218 saves the imbalance data samples that represent the air/fuel ratio imbalances associated with respective cylinders. For example only, a first set of the sampled values of the air/fuel ratio imbalance signal AFIM is saved in the observer table 218 for a comparison with a second set of the sampled values of the air/fuel ratio imbalance signal AFIM. The first set may be generated during a low-lift state, and the second set may be generated during a high-lift state. Depending on a number of sampling events, the observer table 218 may be an array table in a relationship between a number of cylinders 22 and a number of samples per cylinder. For example, a 4-cylinder engine sampled twice per engine cycle has an observer table of size 8.

The valve lift diagnostic module 34 may include a signal monitoring module 220, a camshaft transition module 222, a valve overlap control module 224, a signal comparison module 226, and a fault detection module 228. The signal monitoring module 220 may receive signals from sensors 230 via hardware input/output (HWIO) devices 232. The sensors 230 may include the camshaft phaser position sensor 68, the engine position sensor 72, and the oxygen sensor 74 of FIG. 1.

The signal monitoring module 220 may also access one of the ICFC correction table 204 and the observer table 218 when the engine 12 has operated in a steady condition for a predetermined number of engine cycles. The steady condition may refer to when the engine 12 has operated for a predetermined period: within a first predetermined range of engine speed; and within a second predetermined range of engine load. The steady condition may also include the engine 12 having a charcoal canister vapor flow rate (signal) that is within a third predetermined range for the predetermined period.

The engine 12 may be equipped with an evaporative emissions control system, such as a charcoal canister purge system. The charcoal canister purge system absorbs and temporarily stores an evaporated gas from a fuel line and/or a fuel tank. The evaporated gas may be supplied to the cylinders 22 during engine operation. The charcoal canister vapor flow rate (signal) refers to a flow rate of the evaporated gas. The charcoal canister vapor may not be distributed to each cylinder evenly and the uneven distribution of the charcoal canister vapor may cause the air/fuel ratio imbalances in the cylinders 22.

The signal monitoring module 220 monitors variations of at least one of the signals ICFC, AFIM. For example, the signal monitoring module 220 may sample one of the signals ICFC, AFIM. A first set of sampled values may be generated during a low-lift state and a second set of sampled values may be generated during a high-lift state. The signal monitoring module 220 selectively stores the sampled values associated with each of the cylinders 22 in corresponding table(s). The table(s) may include the ICFC correction table 204 and/or the observer table 218, which are stored in the memory 206.

The camshaft transition module 222 may command each of the SRFF mechanisms 16 to transition to the high-lift state when the first set of the sampled values is stored. The camshaft transition module 222 may signal the valve overlap control module 224 to adjust camshaft phasing for the intake and exhaust valves 30, 32. The camshaft phasing may be adjusted to increase an overlap between opening and closing times of the intake and exhaust valves 30, 32 when the overlap is less than a predetermined value. This ensures that a predetermined amount of residual exhaust gas exists in each of the cylinders 22.

The signal comparison module 226 calculates air/fuel ratio differences between the first and second sets of the sampled values and then compares each of the air/fuel ratio differences to a predetermined threshold. The air/fuel ratio differences may be generated based on valued in the ICFC correction table 204 and/or the observer table 218.

The fault detection module 228 may detect a fault of the camshaft lift system 20 based on the air/fuel ratio differences. The fault detection module 228 may generate and transmit a fault control signal FCS when at least one of the air/fuel ratio differences is greater than the predetermined threshold. The fault control signal FCS may indicate that one or more of the SRFF mechanisms 16 and or the OCVs 18 are malfunctioning. The fault detection module 228 may command a remedial action to prevent degradation of engine components based on the fault control signal FCS.

The HWIO devices 232 may include an interface control module 234 and hardware interfaces/drivers 236. The interface control module 234 may provide an interface between the modules 24, 26, 34 and the hardware interfaces/drivers 236. The hardware interfaces/drivers 236 receive signals from, for example, the camshaft phaser position sensor 68, the pressure sensor 70, the engine position sensor 72, and other engine system devices. The other engine system devices may include ignition coils, spark plugs, throttle valves, solenoids, etc. The hardware interfaces/drivers 236 also receive sensor signals, which are communicated to the respective control modules. The sensor signals may include the oxygen signal O2, the WRAF signal wrAF, and the engine position signal EngPos.

Figure 3A:
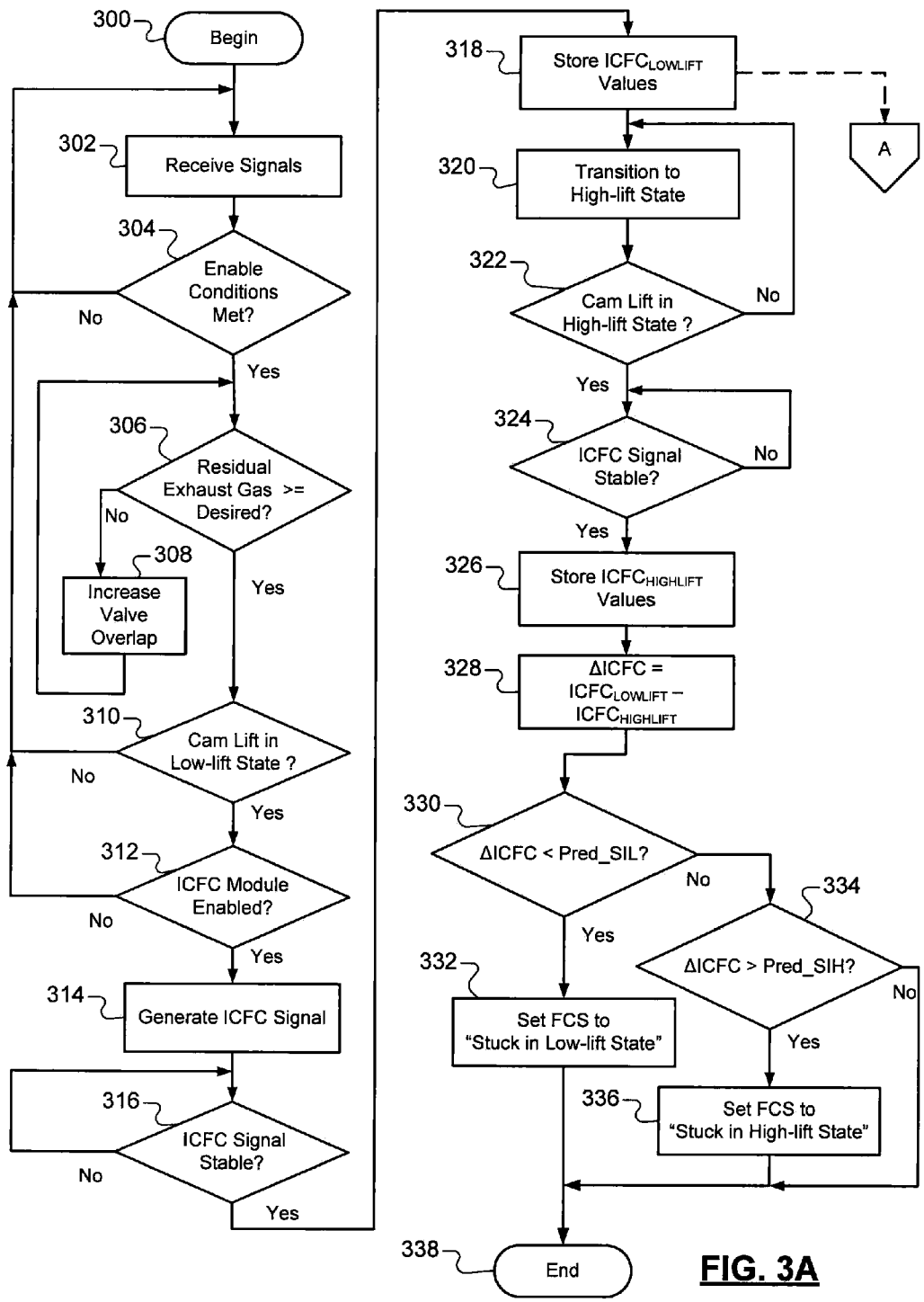
FIGS. 3A-3B illustrate a method of diagnosing the two-step valve lift mechanisms and the oil control valves using the ICFC module of FIG. 1 in accordance with an embodiment of the present disclosure.
Figure 3B:
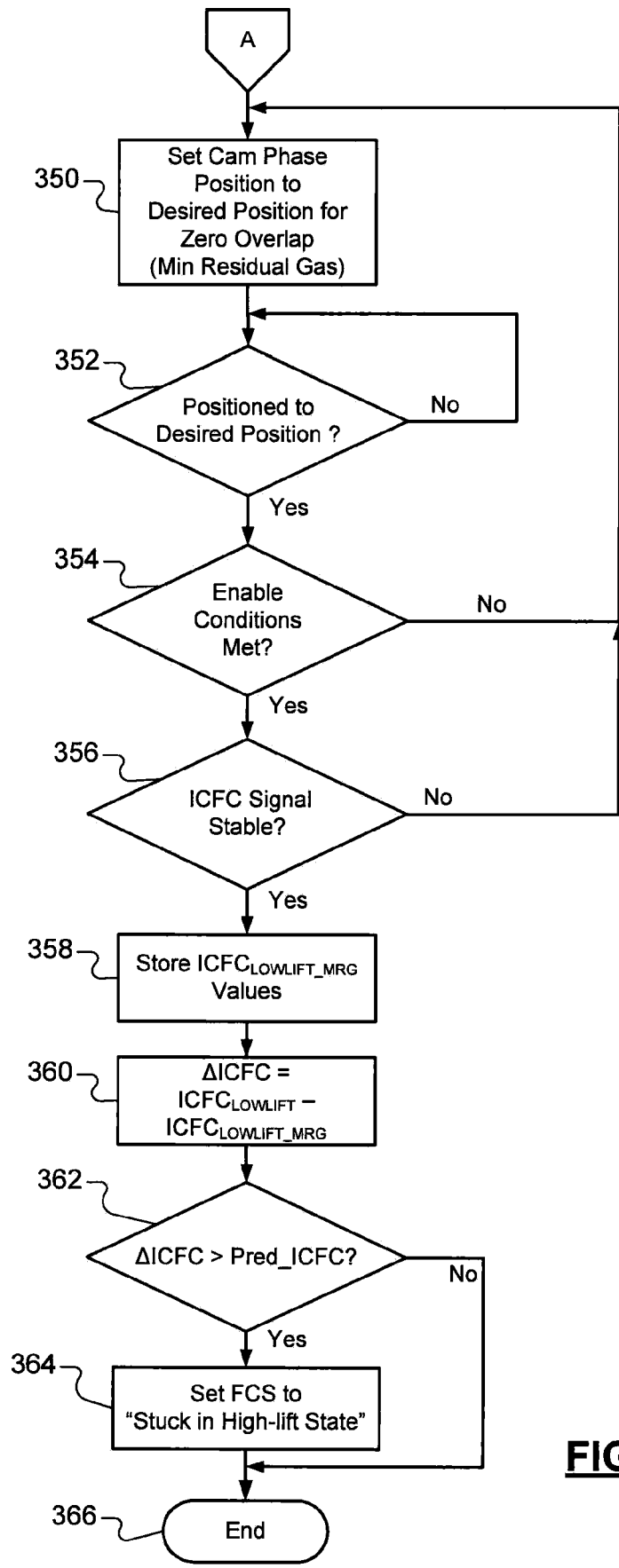

In FIGS. 3A-3B, an exemplary method of diagnosing the SRFF mechanisms 16 and/or the OCVs 18 using the ICFC module 24 of FIG. 1 is shown. Although the following steps are primarily described with respect to the embodiments of FIGS. 1-2, the steps may be modified to apply to other embodiments of the present disclosure. Control of a diagnostic module, such as the valve lift diagnostic module 34 of FIG. 1 may perform the following steps.

The method may begin at step 300. In step 302, signals from the sensors 230 may be received. The signals may include an oxygen signal O2 and/or a WRAF signal wrAF and an engine position signal EngPos. The signal monitoring module 220 may receive the signals via the HWIO devices 232.

In step 304, control may proceed to step 306 when enable conditions are satisfied, otherwise control may return to step 302. The enable conditions may include when the engine 12 has operated for a predetermined period: within a first predetermined range of engine speed; and within a second predetermined range of engine load. The enable conditions may also include the engine 12 having a charcoal canister vapor flow rate that is within a third predetermined range for the predetermined period.

In step 306, control may proceed to step 310 when an estimated amount of residual exhaust gas in a cylinder is greater than or equal to a desired (calibrated or predetermined) amount, otherwise control may proceed to step 308. For example, the valve overlap control module 224 may adjust an overlap between opening and closing times of the intake and exhaust valves 30, 32. The valve overlap control module 224 may determine the estimated amount of residual exhaust gas received by each of the cylinders 22.

In step 308, the valve overlap control module 224 determines residual exhaust gas amounts by adjusting camshaft phasing of the intake and exhaust valves 30, 32 to a first predetermined position. The valve overlap control module 224 may actuate the intake and exhaust camshafts 46, 54 to increase the overlap. Increasing the overlap ensures that the exhaust gas re-circulates back into the cylinders 22 to adjust the air/fuel ratio imbalance. The valve overlap control module 224 may also set a control valve of a charcoal canister purge system to a fully closed position to limit air/fuel ratio changes.

In step 310, control may proceed to step 312 when a camshaft lift position signal indicates that the intake camshaft phaser 58 and/or the exhaust camshaft phaser 60 are in a low-lift state for a predetermined period, otherwise control may return to step 302. In step 312, control may proceed to step 314 when the ICFC module 24 is enabled, otherwise control may return to step 302.

In step 314, the ICFC module 24 generates an individual cylinder fuel correction signal ICFC based on the oxygen and/or WRAF signals O2, wrAF and the engine position signal EngPos. The individual cylinder fuel correction signal ICFC may be indicative of amounts of fuel that are adjusted for each of the cylinders 22 (e.g., +5% correction from a previous injection amount).

In step 316, control may proceed to step 318 when the individual cylinder fuel correction signal ICFC is in a stable condition, otherwise control may wait until the individual cylinder fuel correction signal ICFC is stable. The stable condition refers to when variations in the individual cylinder fuel correction signal ICFC are within a predetermined range for a predetermined period (e.g., engine cycle).

For example, the signal monitoring module 220 monitors and determines whether the individual cylinder fuel correction signal ICFC has been constant for a predetermined number of engine cycles. The individual cylinder fuel correction signal ICFC may fluctuate due to, for example, instrumentation noise and sensor sensitivity. Control may wait until the individual cylinder fuel correction signal ICFC is stabilized for the predetermined number of engine cycles.

In step 318, the signal monitoring module 220 samples the individual cylinder fuel correction signal ICFC and stores a sampled ICFC value $ICFC_{LOWLIFT}$ in the ICFC correction table 204. The sampled ICFC value $ICFC_{LOWLIFT}$ corresponds to one of the cylinders 22. The signal monitoring module 220 iteratively stores the sampled ICFC values corresponding to the rest of the cylinders 22. A first set of the ICFC values generated during the low-lift state remains in the memory 206 for a subsequent comparison with a second set of the ICFC values generated during a high-lift state. Although one sampling event is described herein for each of the cylinders 22, the signal monitoring module 220 may perform multiple sampling events and determine an average value of the sampled ICFC values for each of the cylinders 22.

In step 320, the camshaft transition module 222 executes an intrusive test and commands the camshaft lift system 20 to transition from the low-lift state to the high-lift state to obtain the second set of the ICFC values during the high-lift state. The high-lift state is intrusively activated for a predetermined period to ensure that the camshaft lift system 20 has properly transitioned to the high-lift state. During the intrusive test, engine torque and/or injected fuel amount of the engine 12 are maintained at approximately constant levels even with a lift state change in the camshaft lift system 20.

In step 322, control may proceed to step 324 when the camshaft lift position signal indicates that the intake camshaft phaser 58 and/or the exhaust camshaft phaser 60 are in the high-lift state, otherwise control may return to step 320. In step 324, as in the low-lift state, control may proceed to step 326 when the individual cylinder fuel correction signal ICFC is in a stable condition, otherwise control may wait until the individual cylinder fuel correction signal ICFC is stable.

In step 326, the signal monitoring module 220 samples the individual cylinder fuel correction signal ICFC and stores a sampled ICFC value $ICFC_{HIGHLIFT}$ in the ICFC correction table 204. The sampled ICFC value $ICFC_{HIGHLIFT}$ corresponds to one of the cylinders 22. The signal monitoring module 220 iteratively stores the sampled ICFC values corresponding to the rest of the cylinders 22. This generates the second set of the ICFC values that remains in the memory 206 for a subsequent comparison with the first set of the ICFC values.

In step 328, the signal comparison module 226 compares the first set of the ICFC values to the second set of the ICFC values for each of the cylinders 22. For example, an air/fuel ratio difference $\Delta ICFC$ may be determined by subtracting the second ICFC value $ICFC_{HIGHLIFT}$ from the first ICFC value $ICFC_{LOWLIFT}$. The air/fuel ratio difference $\Delta ICFC$ may be determined based on a ratio of or a difference between the first and second ICFC values $ICFC_{LOWLIFT}$, $ICFC_{HIGHLIFT}$.

In step 330, control may proceed to step 332 when at least one of the air/fuel ratio differences is less than a first predetermined threshold Pred_SIL. This indicates that the corresponding SRFF mechanisms 16 are operating in a faulty state, otherwise control may proceed to step 334. In step 334, control may proceed to step 336 when at least one of the air/fuel ratio differences is greater than a second predetermined threshold Pred_SIH. This indicates that the corresponding SRFF mechanisms 16 are operating in a faulty state, otherwise control may end at step 338.

In step 332, the fault detection module 228 generates a fault control signal FCS that identifies each of the cylinders 22 associated with the faulty SRFF mechanisms and/or OCVs. The fault control signal FCS may indicate that the faulty SRFF mechanisms and/or OCVs are stuck in a low-lift state. The faulty SRFF mechanisms may be individually detected based on the fault control signal FCS.

For example, in the example embodiment shown in FIG. 1, if the fault control signal FCS identifies less than all cylinders (i.e., one cylinder) of an associated OCV, corresponding SRFF mechanisms are faulty. However, if the fault control signal FCS identifies all cylinders (i.e., two cylinders) of the associated OCV, corresponding OCVs may be operating in a faulty state. Control may end at step 338.

In step 336, the fault detection module 228 generates a fault control signal FCS that identifies each of the cylinders 22 associated with the faulty SRFF mechanisms and/or OCVs. The fault control signal FCS may indicate that the faulty SRFF mechanisms and/or OCVs are stuck in a high-lift state. Control may end at step 338.

Referring now to FIG. 3B, alternatively or in addition, control may proceed to step 350 after step 318. An example method shown in FIG. 3B may be performed to improve signal noise after a fault is detected using the method shown in FIG. 3A. The signal noise may refer to a variation of the individual cylinder fuel correction signal ICFC during and/or after transitions between the lift states. For example, a transition from the low-lift state to the high-lift state may cause the variation due to a change in an amount of airflow. This example method may be performed without transitioning the camshaft lift system 20 between the lift states. For example, same camshaft lobes are used during the method shown in FIG. 3B because the lift states are unchanged. This improves a signal-to-noise ratio due to a reduction in a cylinder-to-cylinder change in the amount of air flow. In another embodiment, this method can also be used to detect SRFFs that are stuck in a low-lift state when SRFFs are set to the high-lift state initially at a start of a diagnostic event.

In step 350, the valve overlap control module 224 sets the camshaft phasing of the intake and exhaust valves 30, 32 to a second predetermined (desired) position for zero overlap. The zero overlap refers to when the cam lobes of the intake and exhaust camshafts 46, 54 are positioned to maintain a minimum amount of residual exhaust gas (MRG) for each of the cylinders 22. The zero overlap may cause a variation in the individual cylinder fuel correction signal ICFC within a predetermined range. A fault with the SRFF mechanisms 16 and/or OCVs 18 may be detected when the variation is greater than a predetermined value.

In step 352, control may proceed to step 354 when the intake and exhaust camshafts 46, 54 are positioned to the desired position, otherwise control may wait until the position change is completed. In step 354, control may proceed to step 356 when the enable conditions are satisfied, otherwise control may return to step 350.

In step 356, control may proceed to step 358 when the individual cylinder fuel correction signal ICFC is in a stable condition, otherwise control may return to step 350. In step 358, the signal monitoring module 220 samples the individual cylinder fuel correction signal ICFC and stores a sampled ICFC value $ICFC_{LOWLIFT\_MRG}$ in the ICFC correction table 204. The sampled ICFC value $ICFC_{LOWLIFT\_MRG}$ corresponds to one of the cylinders 22. The signal monitoring module 220 iteratively stores the sampled ICFC values corresponding to the rest of the cylinders 22. This generates the second set of the ICFC values that remains in the memory 206 for the subsequent comparison with the first set of the ICFC values.

In step 360, the signal comparison module 226 compares the first set of the ICFC values to the second set of the ICFC values for each of the cylinders 22. For example, an air/fuel ratio difference $\Delta ICFC$ may be determined by subtracting the second ICFC value $ICFC_{LOWLIFT\_MRG}$ from the first ICFC value $ICFC_{LOWLIFT}$. The air/fuel ratio difference $\Delta ICFC$ may be determined based on a ratio of or a difference between the first and second ICFC values $ICFC_{LOWLIFT}$, $ICFC_{LOWLIFT\_MRG}$.

In step 362, control may proceed to step 364 when at least one of the air/fuel ratio differences is greater than a second predetermined threshold Pred_ICFC. This indicates that the corresponding SRFF mechanisms 16 are operating in a faulty state, otherwise control may end at step 366.

In step 364, the fault detection module 228 generates a fault control signal FCS that identifies each of the cylinders 22 associated with the faulty SRFF mechanisms and/or OCVs. The fault control signal FCS may indicate that the faulty SRFF mechanisms and/or OCVs are stuck in a high-lift state. Control may end at step 366.

Figure 4A:
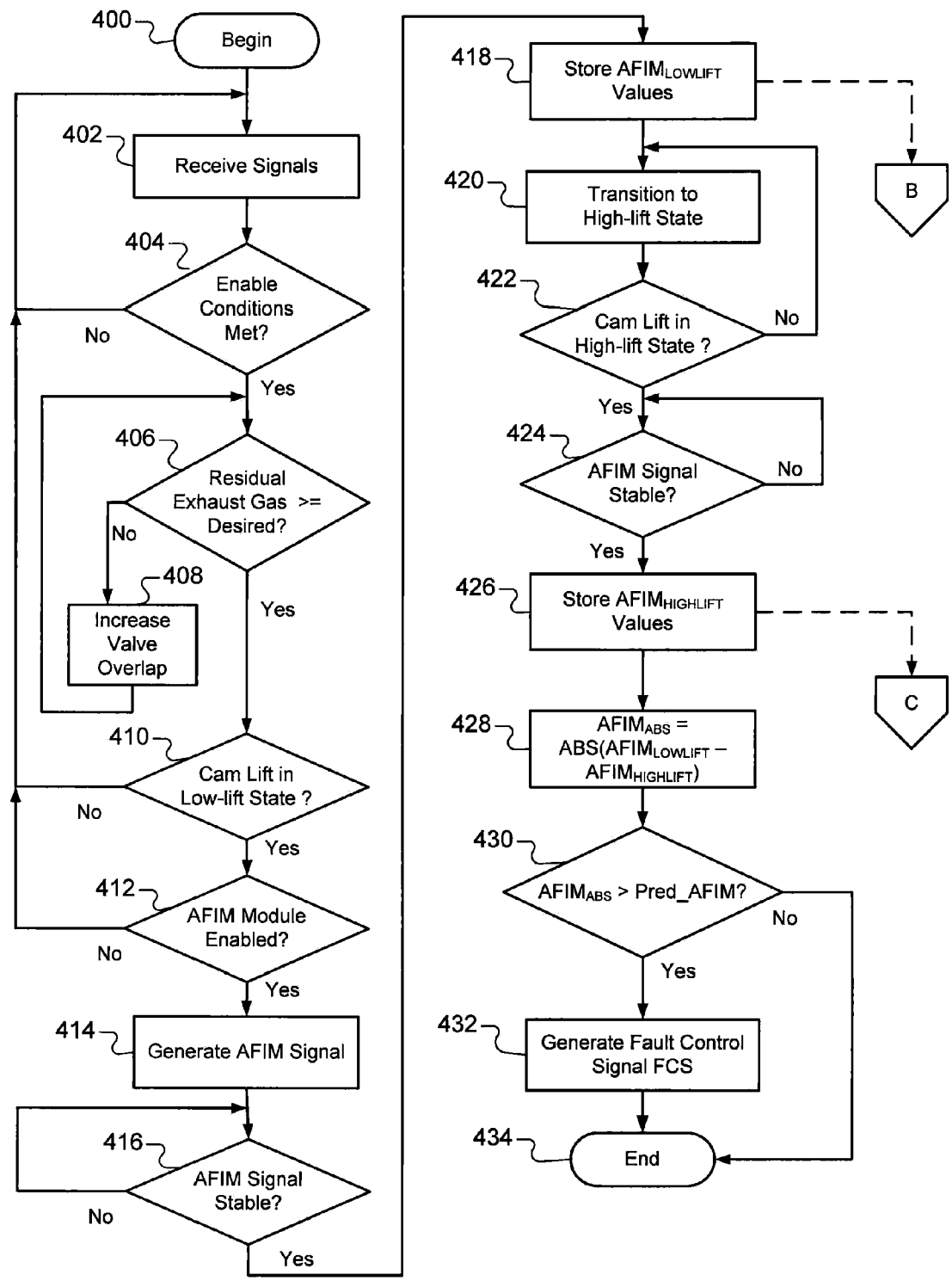
FIGS. 4A-4C illustrate a method of diagnosing the two-step valve lift mechanisms and the oil control valves using the AFIM module of FIG. 1 in accordance with an embodiment of the present disclosure.
Figure 4B:
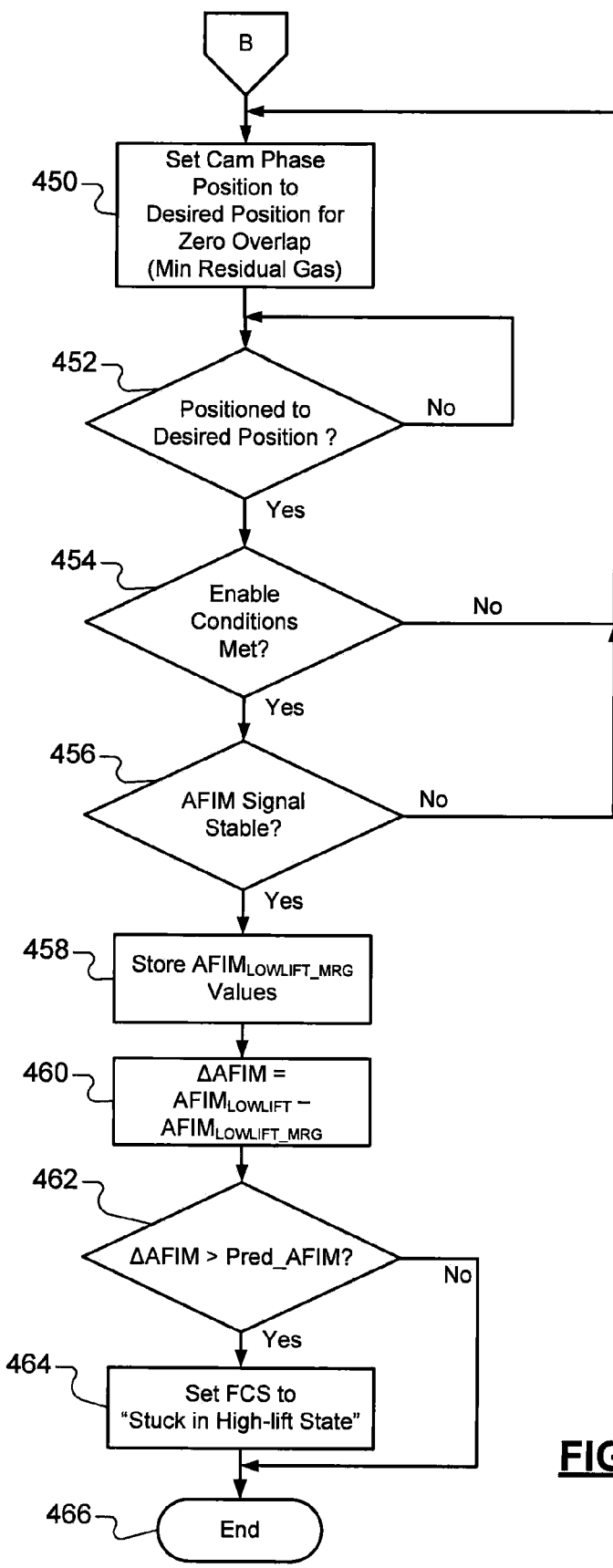
Figure 4C:
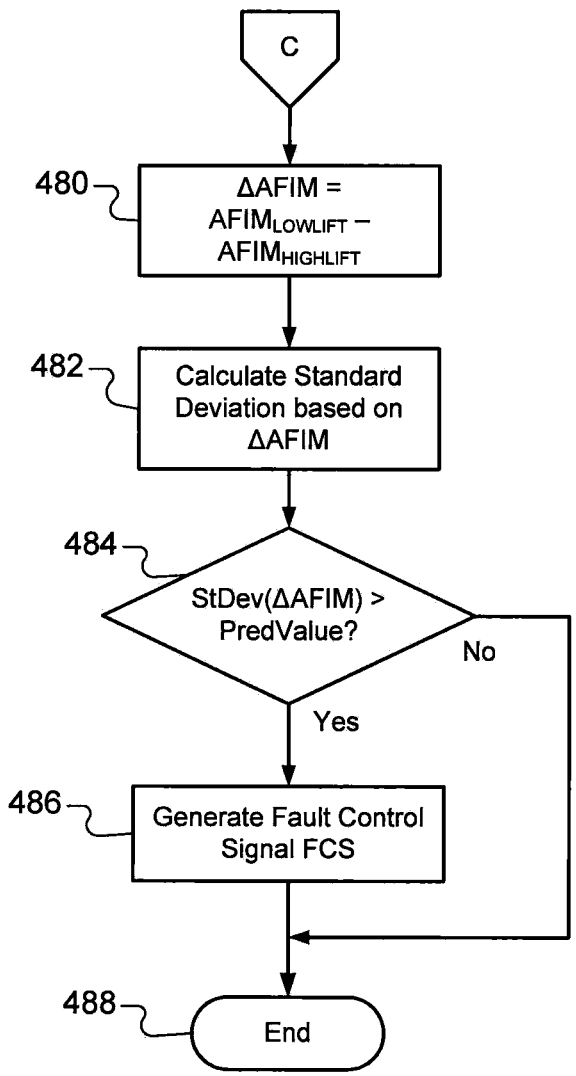

In FIGS. 4A-4C, another exemplary method of diagnosing the SRFF mechanisms 16 and/or the OCVs using the AFIM module 26 of FIG. 1 is shown. Although the following steps are primarily described with respect to the embodiments of FIGS. 1-2, the steps may be modified to apply to other embodiments of the present disclosure. Control of a diagnostic module, such as the valve lift diagnostic module 34 of FIG. 1 may perform the following steps.

In a similar manner to that described above in FIG. 3A-3B, the method may begin at step 400. In step 402, signals from the sensors 230 may be received. The signals may include an oxygen signal O2 and/or a WRAF signal wrAF and an engine position signal EngPos. The signal monitoring module 220 may receive the signals via the HWIO devices 232. In step 404, control may proceed to step 406 when the enable conditions are satisfied, otherwise control may return to step 402.

In step 406, control may proceed to step 410 when an estimated amount of residual exhaust gas in a cylinder is greater than or equal to a desired (calibrated or predetermined) amount, otherwise control may proceed to step 408. For example, the valve overlap control module 224 may adjust an overlap between opening and closing times of the intake and exhaust valves 30, 32. The valve overlap control module 224 may determine the estimated amount of residual exhaust gas received by each of the cylinders 22.

In step 408, the valve overlap control module 224 determines the residual exhaust gas amounts by adjusting camshaft phasing of the intake and exhaust valves 30, 32 to a first predetermined position. The valve overlap control module 224 may actuate the intake and exhaust camshafts 46, 54 to increase the overlap. Increasing the overlap ensures that the exhaust gas re-circulates back into the cylinders 22 to affect the air/fuel ratio imbalance. The valve overlap control module 224 may also set a control valve of a charcoal canister purge system to a fully closed position to limit air/fuel ratio changes.

In step 410, control may proceed to step 412 when a camshaft lift position signal indicates that the intake camshaft phaser 58 and/or the exhaust camshaft phaser 60 are in a low-lift state for a predetermined period, otherwise control may return to step 402. In step 412, control may proceed to step 414 when the AFIM module 26 is enabled, otherwise control may return to step 402.

In step 414, the AFIM module 26 generates an air/fuel ratio imbalance signal AFIM based on the oxygen and/or WRAF signals O2, wrAF and the engine position signal EngPos. The air/fuel ratio imbalance signal AFIM may be indicative of a level of imbalance in air/fuel ratio that is administered to each of the cylinders 22.

In step 416, control may proceed to step 418 when the air/fuel ratio imbalance signal AFIM is in a stable condition, otherwise control may wait until the air/fuel ratio imbalance signal AFIM is stable. The stable condition refers to when variations in the air/fuel ratio imbalance signal AFIM are within a predetermined range for a predetermined period (e.g., engine cycle). For example, the signal monitoring module 220 monitors and determines whether the air/fuel ratio imbalance signal AFIM has been constant for a predetermined number of engine cycles. The air/fuel ratio imbalance signal AFIM may fluctuate due to, for example, instrumentation noise and sensor sensitivity. Control may wait until the air/fuel ratio imbalance signal AFIM is stabilized for the predetermined number of engine cycles.

In step 418, the signal monitoring module 220 samples the air/fuel ratio imbalance signal AFIM and stores a sampled AFIM value $AFIM_{LOWLIFT}$ in the observer table 218. The sampled AFIM value $AFIM_{LOWLIFT}$ corresponds to one of the cylinders 22. The signal monitoring module 220 iteratively stores the sampled AFIM values corresponding to the rest of the cylinders 22. A first set of the AFIM values generated during the low-lift state remains in the memory 206 for a subsequent comparison with a second set of the AFIM values generated during a high-lift state.

Although one sampling event is described herein for each of the cylinders 22, the signal monitoring module 220 may perform multiple sampling events and determine an average value of the sampled AFIM values for each of the cylinders 22. For example, the observer table 218 may be an array table of size equal to a number of cylinders 22 multiplied by a number of samples per cylinder (e.g., a 4-cylinder engine sampled twice per engine cycle has an observer table of size 8).

In step 420, the camshaft transition module 222 executes an intrusive test and commands the camshaft lift system 20 to transition from the low-lift state to the high-lift state to obtain the second set of the AFIM values during the high-lift state. The high-lift state is intrusively activated for a predetermined period to ensure that the camshaft lift system 20 has properly transitioned to the high-lift state.

In step 422, control may proceed to step 424 when the camshaft lift position signal indicates that the intake camshaft phaser 58 and/or the exhaust camshaft phaser 60 are in the high-lift state, otherwise control may return to step 420. In step 424, as in the low-lift state, control may proceed to step 426 when the air/fuel ratio imbalance signal AFIM is in a stable condition, otherwise control may wait until the air/fuel ratio imbalance signal AFIM is stable.

In step 426, the signal monitoring module 220 samples the air/fuel ratio imbalance signal AFIM and stores a sampled AFIM value $AFIM_{HIGHLIFT}$ in the observer table 218. The sampled AFIM value $AFIM_{HIGHLIFT}$ corresponds to one of the cylinders 22. The signal monitoring module 220 iteratively stores the sampled AFIM values corresponding to the rest of the cylinders 22. This generates the second set of the AFIM values that remains in the memory 206 for a subsequent comparison with the first set of the AFIM values.

In step 428, the signal comparison module 226 compares the first set of the AFIM values to the second set of the AFIM values for each of the cylinders 22. For example, an imbalance difference $\Delta AFIM$ may be determined by subtracting the second AFIM value $AFIM_{HIGHLIFT}$ from the first AFIM value $AFIM_{LOWLIFT}$. The imbalance difference $\Delta ICFC$ may be an absolute value that is determined based on a ratio of or a difference between the first and second AFIM values $AFIM_{LOWLIFT}$, $AFIM_{HIGHLIFT}$.

In step 430, control may proceed to step 432 when at least one of the imbalance differences is greater than a predetermined threshold Pred_AFIM. This indicates that the corresponding SRFF mechanisms 16 are operating in a faulty state, otherwise control may end at step 434.

In step 432, the fault detection module 228 generates a fault control signal FCS that identifies each of the cylinders 22 associated with the faulty SRFF mechanisms and/or OCVs. The faulty SRFF mechanisms may be individually detected based on the fault control signal FCS. Control may end at step 338.

Referring now to FIG. 4B, alternatively or in addition, control may proceed to step 450 after step 418. In a similar manner to that described above in FIG. 3B, an example method shown in FIG. 4B may be performed to improve signal noise after a fault is detected using the method in FIG. 4A. In addition, as described below, this example method may identify which lift state the SRFFs and/or OCVs are in when the fault is detected. The signal noise may refer to a variation of the air/fuel ratio imbalance signal AFIM during and/or after transitions between the lift states. This example method may be performed without transitioning the camshaft lift system 20 between the lift states. For example, same camshaft lobes are used during the method shown in FIG. 4B because the lift states are unchanged. This improves the signal-to-noise ratio. In another embodiment, this method can also be used to detect SRFFs that are stuck in a low-lift state when SRFFs are set to the high-lift state initially at a start of a diagnostic event.

In step 450, the valve overlap control module 224 sets the camshaft phasing of the intake and exhaust valves 30, 32 to a second predetermined (desired) position for zero overlap. In step 452, control may proceed to step 454 when the intake and exhaust camshafts 46, 54 are positioned to the desired position, otherwise control may wait until the position change is completed. In step 454, control may proceed to step 456 when the enable conditions are satisfied, otherwise control may return to step 450.

In step 456, control may proceed to step 458 when the air/fuel ratio imbalance signal AFIM is in a stable condition, otherwise control may return to step 450. In step 458, the signal monitoring module 220 samples the air/fuel ratio imbalance signal AFIM and stores a sampled AFIM value $AFIM_{LOWLIFT\_MRG}$ in the observer table 218. The sampled AFIM value $AFIM_{LOWLIFT\_MRG}$ corresponds to one of the cylinders 22. The signal monitoring module 220 iteratively stores the sampled AFIM values corresponding to the rest of the cylinders 22. This generates the second set of the AFIM values that remains in the memory 206 for the subsequent comparison with the first set of the AFIM values.

In step 460, the signal comparison module 226 compares the first set of the AFIM values to the second set of the AFIM values for each of the cylinders 22. For example, an imbalance difference $\Delta AFIM$ may be determined by subtracting the second AFIM value $AFIM_{LOWLIFT\_MRG}$ from the first AFIM value $AFIM_{LOWLIFT}$. The imbalance difference $\Delta AFIM$ may be determined based on a ratio of or a difference between the first and second AFIM values $AFIM_{LOWLIFT}$, $AFIM_{LOWLIFT\_MRG}$.

In step 462, control may proceed to step 464 when at least one of the imbalance differences is greater than a second predetermined threshold Pred_AFIM. This indicates that the corresponding SRFF mechanisms 16 are operating in a faulty state, otherwise control may end at step 466.

In step 464, the fault detection module 228 generates a fault control signal FCS that identifies each of the cylinders 22 associated with the faulty SRFF mechanisms and/or OCVs. The fault control signal FCS may indicate that the faulty SRFF mechanisms and/or OCVs are stuck in a high-lift state. Control may end at step 466.

Referring now to FIG. 4C, alternatively or in addition, control may proceed to step 480 after step 426. In step 480, the signal comparison module 226 compares the first set of the AFIM values to the second set of the AFIM values for each of the cylinders 22. For example, an imbalance difference ΔAFIM may be determined by subtracting the second AFIM value $AFIM_{HIGHLIFT}$ from the first AFIM value $AFIM_{LOWLIFT}$. The imbalance difference ΔAFIM may be determined based on a ratio of or a difference between the first and second AFIM values $AFIM_{LOWLIFT}$, $AFIM_{HIGHLIFT}$.

In step 482, the signal comparison module 226 may calculate a statistical standard deviation or variance based on the imbalance difference ΔAFIM. For example, the signal comparison module 226 may calculate an average value $ΔAFIM_{AVG}$ of the imbalance differences ΔAFIM for all of the cylinders 22. The standard deviation StDev may be calculated based on the average value $ΔAFIM_{AVG}$ and the imbalance differences ΔAFIM.

For example only, the standard deviation StDev may be defined as provided by expression 1.

$$StDev = \sqrt{\frac{1}{N}\sum_{K=1}^{N}(ΔAFIM_K - ΔAFIM_{AVG})^2} \quad (1)$$

N is a number of cylinders, where N is an integer greater than 1. K is an index from 1 to N.

In step 484, control may proceed to step 486 when at least one of the imbalance differences ΔAFIM deviates from the standard deviation StDev greater than a predetermined value PredValue, otherwise control may end at step 488. For example, the deviation may be calculated based on a difference between the standard deviation StDev and the imbalance difference ΔAFIM. A difference of zero (0) may indicate that the air/fuel ratio of a corresponding cylinder is equal to the average value $ΔAFIM_{AvG}$. In contrast, a difference of non-zero (e.g., +/−1) may indicate that the air/fuel ratio of a corresponding cylinder has deviated from the average value $ΔAFIM_{AVG}$. The corresponding SRFF mechanisms 16 are operating in a faulty state when the difference is greater than a predetermined value PredValue.

In step 486, the fault detection module 228 generates a fault control signal FCS that identifies each of the cylinders 22 associated with the faulty SRFF mechanisms and/or OCVs. Control may end at step 488.

Figure 5:
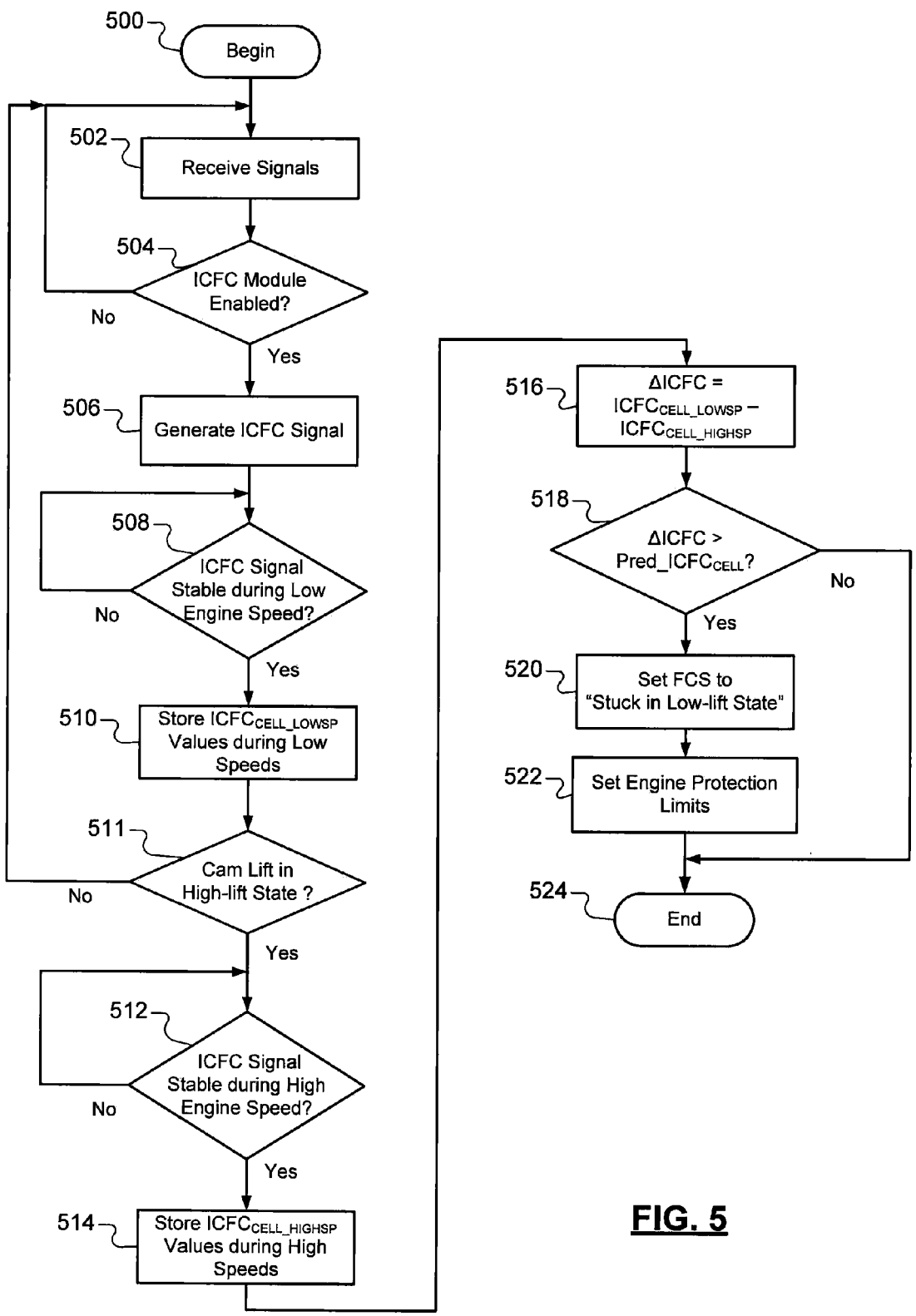
FIG. 5 illustrates another method of diagnosing the two-step valve lift mechanisms and the oil control valves using the ICFC module of FIG. 1 in accordance with an embodiment of the present disclosure.

In FIG. 5, another exemplary method of diagnosing SRFF mechanisms and/or OCVs using the ICFC module 24 of FIG. 1 is shown. This method may be used to detect a fault with the SRFF mechanisms 16 and/or the OCVs 18 when an intake and/or exhaust valve is stuck in a low-lift state at high engine speeds (e.g., greater than 3,000 RPM). An airflow restriction at high speeds due to a valve being stuck in a low-lift state can affect an air/fuel ratio of a corresponding cylinder.

For example, a cylinder with an intake valve that is stuck in a low-lift state may not receive an equal amount of air with respect to other cylinders in a high-lift state. This limits an amount of air received by the cylinder with a faulty intake valve. The SRFF mechanisms 16 and/or OCVs 18 may be diagnosed based on a comparison between the ICFC value at high engine speeds and the ICFC value at low engine speeds. The SRFF mechanisms 16 and/or OCVs 18 may be in a high-lift state during the high engine speeds. Engine speeds that are less than a predetermined speed may be referred to as low engine speeds (e.g., <2500 RPM). Conversely, engine speeds that are greater than or equal to a predetermined speed may be referred to as high engine speeds (e.g., >=3500 RPM).

Although the following steps are primarily described with respect to the embodiments of FIGS. 1-2, the steps may be modified to apply to other embodiments of the present disclosure. Control of a diagnostic module, such as the valve lift diagnostic module 34 of FIG. 1 may perform the following steps.

In a similar manner to that described above in FIGS. 3A-3B, the method may begin at step 500. In step 502, signals from the sensors 230 may be received. The signals may include an oxygen signal O2 and/or a WRAF signal wrAF and an engine position signal EngPos. The signal monitoring module 220 may receive the signals via the HWIO devices 232. In step 504, control may proceed to step 506 when the ICFC module 24 is enabled, otherwise control may return to step 502.

In step 506, the ICFC module 24 generates an individual cylinder fuel correction signal ICFC based on the oxygen and/or WRAF signals O2, wrAF and the engine position signal EngPos. The individual cylinder fuel correction signal ICFC may be indicative of amounts of fuel that are adjusted for each of the cylinders 22.

In step 508, control may proceed to step 510 when the individual cylinder fuel correction signal ICFC is in a stable condition during low engine speeds, otherwise control may wait until the individual cylinder fuel correction signal ICFC is stable. The stable condition refers to when variations in the individual cylinder fuel correction signal ICFC are within a predetermined range for a predetermined period (e.g., engine cycle).

In step 510, the signal monitoring module 220 samples the individual cylinder fuel correction signal ICFC and calculates a speed-load cell value based on a sampled ICFC value, an engine speed, and an engine load. The speed-load cell value may be stored in the ICFC correction table 204 based on a relationship between the engine speed, the engine load, and the sampled ICFC value.

For example only, the speed-load cell value $ICFC_{CELL}$ may be defined as a function (F) provided by expression 2.

$$ICFC_{CELL} = F\{ICFC, RPM, LOAD\} \quad (2)$$

ICFC is a sampled ICFC value. RPM is an engine speed. LOAD is an engine load. The engine load, for example, may be determined based on a MAF signal AirFlow.

A speed-load cell value $ICFC_{CELL\_LOWSP}$ during low engine speeds corresponds to one of the cylinders 22. The signal monitoring module 220 iteratively stores the speed-load cell values corresponding to the rest of the cylinders 22. A first set of the speed-load cell values generated during the low engine speeds remains in the memory 206 for a subsequent comparison with a second set of the speed-load cell values generated during the high engine speeds. Although one sampling event is described herein for each of the cylinders 22, the signal monitoring module 220 may perform multiple sampling events and determine an average value of the sampled ICFC values for each of the cylinders 22.

In step 511, control may proceed to step 512 when the camshaft lift position signal indicates that the intake camshaft phaser 58 and/or the exhaust camshaft phaser 60 are in the high-lift state, otherwise control may return to step 502.

In step 512, control may proceed to step 514 when the individual cylinder fuel correction signal ICFC is in a stable condition during high engine speeds, otherwise control may wait until the individual cylinder fuel correction signal ICFC is stable. Steps 508 and 512 illustrate that the diagnostic method in FIG. 5 performs without an intrusive lift state change that may cause engine torque variations and/or hardware stress for the engine 12.

In step 514, the signal monitoring module 220 samples the individual cylinder fuel correction signal ICFC and calculates a speed-load cell value based on a sampled ICFC value, an engine speed, and an engine load. The speed-load cell value may be stored in the ICFC correction table 204 based on a relationship between the engine speed, the engine load, and the sampled ICFC value.

A speed-load cell value $ICFC_{CELL\_HIGHSP}$ during high engine speeds corresponds to one of the cylinders 22. The signal monitoring module 220 iteratively stores the speed-load cell values corresponding to the rest of the cylinders 22. This generates the second set of the speed-load cell values that remains in the memory 206 for a subsequent comparison with the first set of the speed-load cell values.

In step 516, the signal comparison module 226 compares the first set of the speed-load cell values to the second set of the speed-load cell values for each of the cylinders 22. For example, an air/fuel ratio difference ΔICFC may be determined by subtracting the second speed-load cell value $ICFC_{CELL\_HIGHLIFT}$ from the first speed-load cell value $ICFC_{CELL\_LOWLIFT}$. The air/fuel ratio difference ΔICFC may be determined based on a ratio of or a difference between the first and second speed-load cell values $ICFC_{CELL\_LOWLIFT}$, $ICFC_{CELL\_HIGHLIFT}$.

In step 518, control may proceed to step 520 when at least one of the air/fuel ratio differences is greater than a predetermined threshold $Pred\_ICFC_{CELL}$. This indicates that the air/fuel mixture in the corresponding cylinder during the high engine speeds and in the high-lift state is richer than the air/fuel mixture during the low engine speeds. A rich air/fuel mixture (e.g., air/fuel ratio less than 14.7:1) may be caused by a faulty SRFF mechanism that is stuck in the low-lift state when a same level of air/fuel mixture does not exist during the low engine speeds.

The SRFF mechanisms that are stuck in the low-lift state restrict airflow into the corresponding cylinder. This restriction creates the rich air/fuel mixture because an amount of fuel injected into the corresponding cylinder is greater than an amount of air received by the same cylinder with respect to an air/fuel ratio. A rich air/fuel ratio indicates that the corresponding SRFF mechanisms and/or the corresponding OCVs are operating in a faulty state, otherwise control may end at step 524.

In step 520, the fault detection module 228 generates a fault control signal FCS that identifies each of the cylinders 22 associated with the faulty SRFF mechanisms and/or OCVs. The fault control signal FCS may indicate that the faulty SRFF mechanisms and/or OCVs are stuck in a low-lift state.

In step 522, the fault detection module 228 may command remedial actions to prevent damage to the engine components. For example, the fault detection module 228 may limit an engine speed to a predetermined speed (e.g., below 3,000 RPM). Additionally, the fault detection module 228 may prevent the lift state changes from the low-lift state to the high-lift state. Such remedial actions may protect hardware components of the engine 12 during faulty SRFF and/or OCV operation. Control may end at step 524.

Although three diagnostic methods of the present disclosure shown in FIGS. 3-5 are described separately, the diagnostic methods may be combined and used by a single system. For example, the passive diagnostic method shown in FIG. 5 and the intrusive diagnostic method shown in FIG. 3 may be performed simultaneously or during the same time period. The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for an engine comprising:
a signal monitoring module that receives a cylinder fuel correction signal when an engine speed signal is within a first predetermined range of a speed for a predetermined period and an engine load signal is within a second predetermined range of a load for the predetermined period; and
a fault detection module that detects a fault of at least one of a switchable roller finger follower (SRFF) and an oil control valve (OCV) based on the cylinder fuel correction signal and an exhaust gas recirculation (EGR) value,
wherein the cylinder fuel correction signal is generated based on: an engine position signal; and at least one of an oxygen signal and a wide range air fuel (WRAF) signal.

2. The system of claim 1, further comprising a valve overlap control module that controls activation of intake and exhaust camshafts of a camshaft lift system to adjust an overlap between intake and exhaust strokes for each of N cylinders, where N is an integer greater than 1,
wherein the valve overlap control module determines the EGR value based on the overlap,
wherein the valve overlap control module adjusts camshaft phasing of intake and exhaust valves based on the EGR value, and
wherein the valve overlap control module maintains a predetermined level of residual exhaust gas for each of the N cylinders by setting the camshaft phasing of the intake and exhaust valves to a predetermined position.

3. The system of claim 1, wherein the signal monitoring module samples the cylinder fuel correction signal during a diagnostic event,
wherein the signal monitoring module stores sampled fuel correction values of the cylinder fuel correction signal as first values when a camshaft lift system is operating in a first lift state, and
wherein the signal monitoring module stores the sampled fuel correction values as second values when the camshaft lift system is operating in a second lift state.

4. The system of claim 3, further comprising a camshaft transition module that intrusively commands the camshaft lift system to transition from the first lift state to the second lift state after the signal monitoring module stores the first values during the first lift state, and
wherein the signal monitoring module stores the second values during the second lift state.

5. The system of claim 3, further comprising a signal comparison module that determines differences between the first values and the second values,
wherein the fault detection module generates a fault control signal that indicates the fault when at least one of the differences is greater than a first predetermined threshold, and
wherein the fault detection module generates the fault control signal when at least one of the differences is less than a second predetermined threshold.

6. The system of claim 5, wherein the fault control signal indicates that the fault is with at least one of the SRFFs when the fault control signal is associated with Y of X cylinders, where X is a number of cylinders that are controlled by the OCV and Y is less than X, and wherein the fault control signal indicates that the fault is with the OCV when the fault control signal is associated with the X cylinders.

7. The system of claim 3, wherein the fault detection module, based on a fault control signal, at least one of: limits speed of the engine to a first predetermined speed; permits a first lift state change from the first lift state to the second loft state; and prevents a second lift state change from the second lift state to the first lift state.

8. The system of claim 5, wherein the signal monitoring module stores the sampled fuel correction values as third values when the engine speed signal is less than a second predetermined speed,
wherein the signal monitoring module stores the sampled fuel correction values as fourth values when the engine speed signal is greater than a third predetermined speed,
wherein the signal comparison module determines differences between the third values and the fourth values, and
wherein the fault detection module generates a fault control signal when at least one of the differences is greater than a third predetermined threshold.

9. The system of claim 5, wherein the signal monitoring module stores the sampled fuel correction values as fifth values when camshaft phasing of intake and exhaust valves is set to a first predetermined position,
wherein the signal monitoring module stores the sampled fuel correction values as sixth values when the camshaft phasing of the intake and exhaust valves is set to a second predetermined position,
wherein the signal comparison module determines differences between the fifth values and the sixth values, and
wherein the fault detection module generates a fault control signal when at least one of the differences is greater than a fourth predetermined threshold.

10. The system of claim 1, wherein the signal monitoring module receives an air/fuel ratio imbalance signal when: the engine speed signal is within the first predetermined range for the predetermined period; the engine load signal is within the second predetermined range for the predetermined period; and a carbon canister vapor signal is within a third predetermined range for the predetermined period,
wherein the fault detection module detects the fault based on the air/fuel ratio imbalance signal and the EGR value, and
wherein the air/fuel ratio imbalance signal is generated based on: the engine position signal; and at least one of the oxygen signal and the WRAF signal.

11. A system for an engine comprising:
a signal monitoring module that receives an air/fuel ratio imbalance signal when an engine speed signal is within a first predetermined range of a speed for a predetermined period and an engine load signal is within a second predetermined range of a load for the predetermined period; and
a fault detection module that detects a fault of at least one of a switchable roller finger follower (SRFF) and an oil control valve (OCV) based on the air/fuel ratio imbalance signal and at least one of a residual exhaust gas level of a cylinder of the engine and an intake-to-exhaust camshaft overlap,
wherein the air/fuel ratio imbalance signal is generated based on: an engine position signal; and at least one of an oxygen signal and a wide range air fuel (WRAF) signal.

12. The system of claim 11, wherein the signal monitoring module samples the air/fuel ratio imbalance signal during a diagnostic event,
wherein the signal monitoring module stores sampled imbalance values of the air/fuel ratio imbalance signal as first values when a camshaft lift system is operating in a first lift state, and
wherein the signal monitoring module stores the sampled imbalance values as second values when the camshaft lift system is operating in a second lift state.

13. The system of claim 12, further comprising a signal comparison module that determines differences between the first values and the second values,
wherein the fault detection module generates a fault control signal that indicates the fault when at least one of the differences is greater than a first predetermined threshold, and
wherein the fault detection module generates the fault control signal when at least one of the differences is less than a second predetermined threshold.

14. The system of claim 13, wherein the signal monitoring module stores the sampled fuel correction values as third values when camshaft phasing of intake and exhaust valves is set to a first predetermined position,
wherein the signal monitoring module stores the sampled fuel correction values as fourth values when the camshaft phasing of the intake and exhaust valves is set to a second predetermined position,
wherein the signal comparison module determines differences between the third values and the fourth values, and
wherein the fault detection module generates a fault control signal when at least one of the differences is greater than a third predetermined threshold.

15. A method of diagnosing a camshaft lift system comprising:
receiving at least one of a cylinder fuel correction signal and an air/fuel ratio imbalance signal when: an engine speed signal is within a first predetermined range of a speed for a predetermined period; and an engine load signal is within a second predetermined range of a load for the predetermined period;
detecting a fault of at least one of a switchable roller finger follower (SRFF) and an oil control valve (OCV) based on an exhaust gas recirculation (EGR) value and at least one of the cylinder fuel correction signal and the air/fuel ratio imbalance signal; and
generating the cylinder fuel correction signal and the air/fuel ratio imbalance signal based on: an engine position signal; and at least one of an oxygen signal and a wide range air fuel (WRAF) signal.

16. The method of claim 15, further comprising:
controlling activation of intake and exhaust camshafts of a camshaft lift system to adjust an overlap between intake and exhaust strokes for each of N cylinders, where N is an integer greater than 1;
determining the EGR value based on the overlap;
adjusting camshaft phasing of intake and exhaust valves based on the EGR value; and
maintaining a predetermined level of residual exhaust gas for each of the N cylinders by setting the camshaft phasing of the intake and exhaust valves to a predetermined position.

17. The method of claim 15, further comprising:
sampling at least one of the cylinder fuel correction signal and the air/fuel ratio imbalance signal during a diagnostic event,
storing sampled values from at least one of the cylinder fuel correction signal and the air/fuel ratio imbalance signal as first values when at least one of: a camshaft lift system is operating in a first lift state; and camshaft phasing of intake and exhaust valves is set to a first predetermined position, and wherein the sampled values are stored as second values when at least one of: the camshaft lift system is operating in a second lift state; and the camshaft phasing of the intake and exhaust valves is set to a second predetermined position.

18. The method of claim 17, further comprising:

intrusively commanding the camshaft lift system to transition from the first lift state to the second lift state after the signal monitoring module stores the first values during the first lift state; and storing the second values during the second lift state.

19. The method of claim 17, further comprising:

determining differences between the first values and the second values;

generating a fault control signal that indicates the fault when at least one of the differences is greater than a first predetermined threshold; and generating the fault control signal that indicates the fault when at least one of the differences is less than a second predetermined threshold.

20. The method of claim 19, further comprising:

indicating that the fault is with at least one of the SRFFs when the fault control signal is associated with Y of X cylinders, where X is a number of cylinders that are controlled by the OCV and Y is less than X; and indicating that the fault is with the OCV when the fault control signal is associated with the X cylinders.

21. The method of claim 20, further comprising:

limiting speed of the engine to a first predetermined speed based on the fault control signal;

permitting a first lift state change from the first lift state to the second lift state based on the fault control signal; and preventing a second lift state change from the second lift state to the first lift state based on the fault control signal.

22. The method of claim 20, further comprising:

storing the sampled values as third values when the engine speed signal is less than a second predetermined speed;

storing the sampled values as fourth values when the engine speed signal is greater than a third predetermined speed;

determining differences between the third values and the fourth values; and generating the fault control signal when at least one of the differences is greater than a third predetermined threshold.

* * * * *